United States Patent Office 3,392,157
Patented July 9, 1968

3,392,157
MOLDING COMPOSITIONS COMPRISING A BLEND OF A METHYL METHACRYLATE RESIN AND A BUTADIENE-METHYL METHACRYLATE-ETHYL ACRYLATE TERPOLYMER
Mikio Izumi, Ohtake-shi, Japan, assignor to Mitsubishi Rayon Co., Ltd., Tokyo, Japan, a corporation of Japan
No Drawing. Filed Aug. 11, 1964, Ser. No. 388,934
Claims priority, application Japan, Aug. 12, 1963, 38/40,981
8 Claims. (Cl. 260—887)

This invention relates to a molding composition having excellent transparency and impact resistance. More particularly, it relates to a molding composition produced by blending a novel rubbery polymer with a rigid resinous methacrylic polymer which can be molded into tough articles having excellent transparency and improved impact resistance.

It is well-known to blend a rigid resinous polymer with a rubbery material for improving impact resistance of the rigid resinous polymer. It is clear that for the purpose of obtaining a molding composition which will provide molded articles having improved impact resistance many useful molding compositions improved by way of blending have been widely employed in the fields of industries. However, most such compositions heretofore have provided molded articles having little or no transparency and applications of those molding compositions are naturally restricted accordingly.

Rigid resinous methacrylic polymers are well-known to have extremely excellent transparent gloss and provide molded articles which are most characteristic in this regard.

An object of the present invention is to provide a methacrylic molding composition having improved impact-resistance without losing said advantage. A further object of the present invention is to provide a molding composition which can be molded into articles of various shapes by conventional molding processes by blending a rigid resinous methacrylic polymer with a novel rubbery polymer which is obtained by polymerizing a mixture of monomers comprising butadiene, methyl methacrylate, ethyl acrylate and a small amount of cross linking agent. Other objects of the present invention and advantages yielded thereby will become apparent as description proceeds.

According to the present invention, above-mentioned objects are attained by blending the following A with B:

(A) From 5 to 35 parts by weight of rubbery polymer obtained by polymerising a mixture of monomers comprising from 20 to 60% by weight of butadiene (I), from 5 to 60% by weight of methyl methacrylate (II) and from 10 to 75% by weight of ethyl acrylate (III) wherein total of (II) and (III) is from 40 to 80% by weight or alternatively (II) is from 40 to 50% by weight when the mixture consists of only (I) and (II), up to 5 parts by weight of a cross-linking agent which has at least two unsaturated carbon-carbon bonds in its molecule being incorporated into 100 parts by weight of said mixture of monomers.

(B) From 65 to 95 parts by weight of a rigid resinous methacrylic polymer which is obtained by polymerising a mixture comprising from 80 to 100% by weight of methyl methacrylate and up to 20% by weight of methyl acrylate.

A particularly preferred rubbery polymer for attaining objects of the present invention is a polymer obtained from a mixture of monomers containing therein from 5 to 55% by weight of (II), from 10 to 60% by weight of (III) and from 0.5 to 3.0 parts by weight of a cross linking agent based on 100 parts of the total of (I), (II) and (III).

When the ratio of butadiene in the mixture of monomers to produce the rubbery polymer is less than 20% by weight and the residue of the mixture is (II) or (III), or a mixture of (II) and (III) at a optional ratio, the blend composition utilizing the rubbery polymer obtained from such monomers mixture is found to provide molded articles having good transparency but less improved impact resistance. When the ratio of butadiene exceeds 60% by weight, the blend composition utilizing the rubbery polymer obtained from such monomers mixture is found to provide molded articles having improved impact resistance but little or no transparencey. A particularly preferred butadiene content in the rubber component is from 30 to 55%. The blend composition including the rubbery polymer containing methyl methacrylate more than 60% by weight is found to provide molded articles having rather good transparency which, however, become brittle at a low temperature around 0° C. It is found that molded articles having particularly excellent transparency are provided very advantageously when the rubbery polymer utilized is produced from the mixture of monomers containing at least 10% by weight of ethyl acrylate. It is also found that the composition including the rubbery substance obtained from the monomers mixture wherein methyl methacrylate is not contained at all provides molded articles of inferior impact resistance to those counterparts which are molded from the composition including the rubbery substance from the monomers mixture containing more than 5% by weight of methyl methacrylate. When increasing amount of the cross linking agent which is incorporated in the monomers mixture, impact resistance of the molded articles from such composition is initially increased correspondingly. However, it becomes adversely diminished when the cross linking agent exceeds from 2 to 2.5 parts by weight based on 100 parts by weight of the monomers mixture.

As for such molding composition wherein a rubbery substance and a rigid resinous polymer are blended together, it is known that improvement in impact resistance is very little if content of the rubbery substance is small and that stiffness, tensile strength, heat distortion and the like which are important and necessary properties for molded articles become lowered although improvement in impact resistance is remarkable if content of the rubbery substance is too large. In the present composition, inclusion of from 5 to 35 parts by weight of the rubbery polymer and from 65 to 95 parts by weight of the rigid resinous polymer based on 100 parts by weight of the composition is found to be preferred for attaining objects of the present invention.

Compounds having at least two unsaturated carbon-carbon bonds in the molecules which may be used as the cross linking agent include anhydrides of unsaturated acids which are polymerisable as such, e.g., acrylic acid anhydride, methacrylic acid anhydride and the like, diester of diol with unsaturated acids which are polymerisable as such, e.g., ethylene glycol diacrylate, polyethylene glycol diacrylate, ethylene glycol dimethacrylate, polyethylene glycol dimethacrylate and the like, esters of unsaturated acids which are polymerisable as such with unsaturated alcohols which are polymerisable as such, e.g., allyl acrylate, methallyl acrylate, allyl methacrylate, methallyl methacrylate and the like, polybasic acid esters of unsaturated alcohols which are polymerisable as such, e.g., diallyl phthalate, triallyl cyanurate, and the like, and other compounds containing two or more vinylic groups which are polymerisable by themselves such as divinylbenzene excluding dienes.

Polymerisation of aforementioned monomers mixture to produce rubbery polymer is effected, for example, by conventional emulsion polymerisation process in aqueous system in the presence of a water-soluble radical initiator and an emulsion stabilizer. In this case, examples of the water-soluble radical initiator include salts of persulfuric acid such as potassium persulfate, sodium persulfate, ammonium persulfate and the like, hydroperoxides such as hydrogen peroxide, tertiary butyl hydroperoxide, cumene hydroperoxide and the like combinations of said persulfates or hydroperoxides, water-soluble salts containing reducing metallic ions such as ferrous salt, cuprous salt, salt of divalent cobalt, salt of divalent nickel and the like, and other water-soluble reducing salts such as sodium sulfite, sodium bisulfite and the like, which are known to form redox initiator systems. Examples of the emulsion stabilizer include salts of higher fatty acids such as potassium stearate, sodium stearate and the like, salts of higher alkyl sulfuric acid ester such as sodium lauryl sulfate, sodium stearyl sulfate and the like, salts if alkyl aryl sulphonic acids such as sodium dodecyl benzene sulfonate and the like, salts of dialkyl sulfosuccinic acids such as sodium dioctyl sulfosuccinate, sodium dihexyl sulfosuccinate and the like. However, it is found that salts of dialkyl sulfosuccinic acids are used particularly advantageously for the compositions providing molded articles of extremely colourless transparency.

Emulsion polymerisation is effected by pouring 100 parts by weight of the monomers mixture of previously defined composition into from 100 to 1000 parts by weight of demineralized water containing said water-soluble radical initiator and emulsion stabilizer, substituting the atmosphere of polymerisation system with nitrogen gas or excess butadiene gas and reacting the monomers mixture until more than 70% is converted to the polymer in the closed system at a temperature from 5 to 80° C. depending on sorts of radical initiator used. In this case, a small amount of a polymerisation modifier such as lauryl mercaptan, tertiary dodecyl mercaptan ester of thioglycol acid or the like may be incorporated therein if necessary.

The rigid resinous methacrylic polymer is easily produced by polymerising a polymerisable mixture comprising 100 parts by weight of a monomers mixture of from 80 to 100% by weight of methyl methacrylate and up to 20% by weight of methyl acrylate and up to 1.5 parts by weight of one or more polymerisation modifiers such as mercaptans (e.g. lauryl mercaptan, tertiary dodecyl mercaptan and the like), esters of thioglycol acids, thioesters, thiophenols and the like by way of either emulsion polymerisation in an aqueous system in the presence of a water-soluble radical initiator and an emulsion stabilizer or suspension polymerisation in an aqueous system containing a suspension stabilizer in the presence of oil-soluble radical initiator. Examples of water-soluble radical initiator and emulsion stabilizer used in the emulsion polymerisation are the same as those for aforementioned rubbery polymer. Examples of oil-soluble radical initiators used in the suspension polymerisation include peroxides such as benzoyl peroxide, ditertiary butyl peroxide, lauryl peroxide and the like, esters of peracids such as tertiary butyl perbenzoic acids and the like, and azo compounds such as $\alpha,\alpha'$-azodiisobutyronitrile and the like. Examples employed as the suspension stabilizer include polymeric electrolytes such as water-soluble salts of polyacrylic acid, water-soluble salts of partially saponified poly(methyl acrylate), water-soluble salts of polymethacrylic acid, water-soluble salts of partially saponified poly(methyl methacrylate) and the like and other water-soluble polymeric substances such as polyvinyl alcohol, partially saponified polyvinyl acetate.

Prepared methacrylic polymer, whether by emulsion polymerisation or suspension polymerisation or any other process, should have intrinsic viscosity in chloroform solution at 25° C. in the range between 0.04 and 0.08 for particularly advantageous practices of the present invention. In order to obtain the composition which provides molded articles having particularly excellent transparency and brilliance, it is found to be advantageous that rigid resinous methacrylic polymer is prepared by a suspension polymerisation process.

Blending of the rubbery polymer with the rigid resinous polymer produced respectively by above-mentioned methods is attained by, for example, the steps described hereunder.

An aqueous emulsion containing the rubbery polymer and an aqueous emulsion or suspension containing the rigid resious polymer in such a ratio that will provide from 5 to 35 parts by weight of rubbery polymer against from 65 to 95 parts by weight of rigid resinous polymer may be blended and fully agitated to become uniform, then both polymers which are kept in the uniformly mixed condition may be simultaneously separated from the aqueous phase by means of coagulation or the like. According to another step, one of said two polymers, e.g., the rigid resinous polymer, may be preliminarily separated from the aqueous phase, fully blended with the emulsion containing the other polymer, e.g., the rubbery polymer, in the necessary amount for providing above-mentioned blend composition, and then while kept uniformly mixed condition the latter polymer may be separated from the aqueous phase by means of coagulation or the like to obtain uniform mixture of both polymers. According to still another embodiment, each of both polymers may be respectively separated from the aqueous phase at first, and both are blended in solid states in a blending equipment such as blender. Regardless the manner of blending, it is preferred to blend the resulting composition again in the molten state by means of a blending equipment for polymeric substances such as mixing rolls, extruder, Banbury mixer or the like for obtaining the composition for molding.

It is well-known that a small amount of antioxidant is generally incorporated in a blended composition prepared from a rubbery substance and a rigid resinous polymer for preventing such composition from undesirable changes such as decomposition, discolouring and the like due to the action of heat, oxygen and the like on the rubbery substance when processed by extrusion, injection molding or the like. Also for the present compositions, it is preferred that one or more antioxidants should be incorporated at an optional step in a series of many treatments until finished into the final composition. The antioxidants to be incorporated are preferred to be non-contaminating and to be employed as a combination of more than two sorts which make especially increased effects known as synergism.

Especially preferred antioxidants for the purpose of present invention contain (I) a phenolic compound selected from a compound containing one phenolic hydroxy group in its molecule such as 2,6-di-tert.-butyl-4-methyl phenol, p-butyl amino phenol or the like, a compound containing two phenolic hydroxy groups in its molecule such as 2,2'-methylene bis(4-methyl-6-tert. butyl phenol), 4,4'-thio bis(6-tert. butyl-2-methyl phenol) or the like, and a compound containing three phenolic hydroxy groups in its molecule such as 2,6-bis(2'-hydroxy 3'-tert. butyl 5'-methyl benzoyl)-4-methyl phenol or the like, or a derivative thereof and (II) an alkyl ester of thio di-fatty acid such as dilauryl thio dipropionate, distearyl thio dipropionate or the like and/or (III) 2-mercaptobenzoimidazole or its derivative. For obtaining the composition which will provide especially colourless molded articles of excellent transparency, employment of compounds (I), (II) and (III) in combination respectively in an amount from 0.001 to 5 parts by weight based on 100 parts by weight of the composition is found to be particularly advantageous.

Compositions according to the present invention, as such or if necessary incorporated with ultra-violet light absorbers for protecting from reactions of ultra-violet light, lubricants for increasing the fluidity at molding, dyestuffs and/or pigments for colouring the composition and/or other fillers, can be molded by any conventional fabricating process such as compression molding, extrusion, injection molding or the like into very useful molded articles of various shapes by the excellent transparency and improved impact-resistance.

The following examples illustrate manners how the present invention is applied, however, they should not be interpreted to limit the scope of the present invention. Parts in the examples are by weight unless otherwise specified.

EXAMPLE 1

(A) Preparation of rubbery polymer.—Mixture of 40 parts of butadiene, 60 parts of methyl methacrylate, 1.0 part of ethylene glycol dimethacrylate, 0.1 part of lauryl mercaptan, 200 parts of demineralized water, 0.5 part of potassium persulfate and 3 parts of Aerosol OT which is an emulsion stabilizer containing sodium salt of dialkyl sulfosuccinic acid as the main components was charged into a polymerisation vessel suitable for reactions under pressure equipped with a heating jacket and stirrer. Small amount of butadiene was further added in the vessel and the air within the reactor was purged with the butadiene gas. The reaction system was heated to 50° C. by circulating hot water in the heating jacket while mixing within the system by the stirrer until pressure of interior of the reaction vessel became unable to be detected by the pressure gauge. It took about 4 hours. Polymerisation conversion calculated from the polymer content of resulted latex was more than 90%.

(B) Preparation of rigid resinous polymer.—Mixture of 100 parts of methyl methacrylate, 0.6 part of lauryl mercaptan, 200 parts of demineralized water, 0.2 part of potassium persulfate and 0.5 part of Aerosol OT was poured into the same reaction vessel as described in A. After the air within the reaction vessel was substituted with nitrogen gas, the vessel was closed. Circulating hot water of 70° C. in the jacket, heating and mixing by the stirrer was continued for 1.5 hours. Polymerisation conversion calculated from the polymer content of resulted latex was more than 98%. Intrinsic viscosity of the polymer in chloroform solution at 25° C. was 0.06.

(c) 60 parts of emulsion containing the rubbery polymer produced by A was mixed with 220 parts of emulsion containing the resinous polymer produced by B. A dispersion was added therein which comprised 2 parts of 2,6-ditertiary butyl 4-methyl phenol compulsorily dispersed in 20 parts of water by a ball-mill. After the mixture became uniform by the agitational mixing, it was poured into 500 parts of heated 1% aqueous solution of calcium chloride whereby the polymeric mixture was simultaneously salted out and coagulated. Then it was filtered and washed thoroughly with hot water. Resulted polymeric mixture was dried at 60° C. and about 100 parts of white powdery composition was obtained. Judging from the polymer contents of both emulsions employed, components of the composition were estimated to consist of 20 parts of the rubbery polymer and 80 parts of the resinous polymer. Powdery composition thus obtained was mixed in the molten state at 230° C. by an extruder and made into pellets. Then a tetragonal test piece of 110 mm. x 110 mm. x 2 mm. was formed therefrom by injection molding. Although it had thin yellow color its total light transmittance was 75% and the parallel light transmittance was 80% of it. In order to determine its impact strength, it was placed horizontally on a support designed to hold surroundings of this test piece and a steel ball of 200 g. was dropped thereon in the center. The height when 50% of the sample was broken or destroyed was observed. It was more than 150 cm. On the other hand, when the rigid resinous polymer produced by a method as described in (B) was molded into the same sample in the same manner, a colourless transparent molded article was obtained, which was only 22 cm. when 50% was destroyed.

EXAMPLE 2

(A) The rubbery polymer of Example 1 was employed.

(B) Mixture of 95 parts of methyl methacrylate, 5 parts of methyl acrylate and 0.7 part benzoyl peroxide together with 200 parts of demineralized water containing 4 parts of partially saponified poly(methyl methacrylate) was poured into the same reaction vessel as employed in Example 1 which was then closed, and polymerised for 1 hour while passing steam into the jacket. Polymerisation conversion was 98%. Intrinsic viscosity of resulting polymer in chloroform solution at 25° C. was 0.06.

(C) Into 48 parts of emulsion containing the rubbery polymer produced by A of Example 1, 51 parts of the polymer obtained in B of this example and filtered beforehand, the aqueous dispersion of same antioxidant as in Example 1 and 150 parts of water to make mixing operation easy were added. After fully agitated and blended, the mixture was salted out, coagulated, washed and dried in the same manner as in Example 1. About 70 parts of white bulky composition of minute particles were obtained. Mixed ratio was estimated to be 20 parts of the rubbery polymer against 80 parts of the resinous polymer. It was formed into a test piece as in Example 1. Although it had thin yellow color, its total light transmittance was 78% and the parallel light transmittance was 87% of it. Drop height of 200 g. steel ball for breaking 50% of the sample was more than 200 cm. while it was 22 cm. when a test piece from the rigid resinous polymer of this example was determined.

EXAMPLE 3

Procedures of Example 1 were followed except the antioxidant comprised 0.5 par of 2,6-ditertiary butyl 4-methyl phenol, 1 part of dilauryl thio dipropionate and 0.3 part of 2-mercaptobenzo imadazole in place of 2 parts of 2,6-ditertiary butyl 4-methyl phenol. Test pieces from resulted composition were hardly coloured to yellow.

EXAMPLE 4

Emulsion polymerisation process of A in Example 1 was followed except that the mixture for polymerisation reaction comprised 30 parts of butadiene, 50 parts of methyl methacrylate, 20 parts of ethyl acrylate, 1 part of ethylene glycol dimethacrylate, 0.1 part of lauryl mercaptan, 400 parts of demineralized water, 0.8 part of potassium persulfate and 3 parts of Aerosol OT. More than 90% conversion was observed in 4 hours. Emulsion containing the rubbery polymer was then treated to yield the composition by the same procedures as in Example 1 except that antioxidant was the mixture of Example 3. Resulted composition consisting of 20 parts of the rubbery polymer and 80 parts of the resinous polymer. Test pieces formed as in Example 1 were substantially colourless. The total light transmittance was 78% and the parallel light transmittance was 90% of it. 50% break height was 150 cm.

EXAMPLE 5

Polymerization procedures in Example 4 were followed except that the monomers mixture comprised 40 parts of butadiene, 25 parts of methyl methacrylate, 35 parts of ethyl acrylate and 1.5 parts of ethylene glycol dimethacrylate. Utilizing thus obtained emulsion containing the rubbery polymer, a composition consisting of 20 parts of the rubbery polymer and 80 parts of the resinous polymer was obtained. The total light transmittance of a test piece formed as in Example 1 was about 80% and the parallel light transmittance was about 98% of it. 50% break height was 200 cm.

EXAMPLE 6

A composition consisting of 30 parts rubbery polymer and 70 parts resinous polymer was obtained from the rubbery polymer of Example 4 and the rigid resinous polymer prepared in Example 2. The total light transmittance of a test piece formed as in Example 1 was more than 90% and the parallel light transmittance was more than 98% of it. 50% break height was more than 200 cm.

EXAMPLE 7

A composition consisting of 20 parts rubbery polymer and 80 parts resinous polymer was obtained by the same procedures as in Example 6 except the monomers mixture comprised 45 parts of butadiene, 10 parts of methyl methacrylate, 45 parts of ethyl acrylate and 2.0 parts of ethylene glycol dimethacrylate. The total transmittance of a test piece therefrom was more than 90% and the parallel light transmittance was 90% of it. 50% break height was more than 200 cm.

EXAMPLE 8

A composition consisting of 10 parts rubbery polymer and 90 parts resinous polymer was obtained by modifying only mixing ratio procedures of Example 6. A test piece therefrom exhibited more than 90% of the total light transmittance (the parallel one was more than 90% of it) and 70 cm. of 50% break height.

EXAMPLE 9

A composition consisting of 20 parts rubbery polymer and 80 parts resinous polymer was obtained by the same procedures as in Example 6 except the monomers mixture comprised 55 parts of butadiene, 10 parts of methyl methacrylate and 35 parts of ethyl acrylate. A test piece therefrom exhibited more than 90% of the total light transmittance (the parallel one was more than 80% of it) and more than 200 cm. of 50% break height.

EXAMPLE 10

A composition consisting of 20 parts rubbery polymer and 80 parts resinous polymer were obtained by the same procedures as in Example 6 except the monomers mixture comprised 50 parts of butadiene and 50 parts of ethyl acrylate. It exhibited more than 90% of the total light transmittance (the parallel one was more than 70% of it) and more than 200 cm. of 50% break height.

EXAMPLE 11

A composition comprising 20 parts rubbery polymer and 80 parts resinous polymer was obtained by the same procedures as in Example 9 except the resinous polymer was prepared from 90 parts of methyl methacrylate and 10 parts of methyl acrylate. It exhibited more than 90% of the total light transmittance (the parallel one was more than 80% of it, and more than 200 cm. of 50% break height.

What is claimed is:

1. A molding composition produced by blending (A) from 5 to 35 parts by weight of a rubbery polymer prepared by polymerizing a mixture of monomers comprising from 20 to 60% by weight of butadiene (I), and from to 60% by weight of methylmethacrylate (II), and from 10 to 75% by weight of either acrylate (III), wherein the total of (II) and (III) is from 40 to 80% by weight, and from 0.1 to 5 parts by weight of a cross-linking agent having at least two unsaturated carbon-carbon bonds in its molecule is incorporated into 100 parts by weight of said mixture of monomers, with (B) from 65 to 95 parts by weight of a rigid resinous methyl methacrylate polymer which is obtained by polymerizing a mixture comprising from 80 to 100% by weight of methyl methacrylate and from 0 to 20% by weight of methyl acrylate.

2. A molding composition according to claim 1, wherein the rubbery polymer (A) is prepared by polymerizing a monomer mixture of from 30 to 55% by weight of butadiene (I), from 5 to 55% by weight of methyl methacrylate (II) and from 10 to 60% by weight of ethyl acrylate (III), from 0.5 to 3 parts by weight of ethylene glycol dimethacrylate as a cross-linking agent being incorporated into 100 parts by weight of said monomer mixture.

3. A molding composition produced by blending (A) from 5 to 35 parts by weight of a rubbery polymer prepared by emulsion polymerisation, in an aqueous system, of a mixture of monomers comprising from 30 to 55% by weight of butadiene, from 5 to 55% by weight of methyl methacrylate and from 10 to 60% by weight of ethyl acrylate, in 100 parts by weight of which from 0.1 to 5.0 parts by weight of ethylene glycol dimethacrylate is contained, with (B) from 65 to 95 parts by weight of a rigid resinous methacrylic polymer which is prepared by polymerising a mixture of monomers comprising from 80 to 100% by weight of methyl methacrylate and up to 20% by weight of methyl acrylate in an aqueous system.

4. A molding composition as claimed in claim 3 wherein the rigid resinous methacrylic polymer is prepared by suspension polymerisation in an aqueous system.

5. A molding composition as claimed in claim 3 wherein the rigid resinous methacrylic polymer is prepared by emulsion polymerisation in an aqueous system containing sodium dioctyl sulfo succinate or sodium dihexyl sulfosuccinate as the emulsion stabilizer.

6. A molding composition as defined in claim 3 which contains at least one member selected from the group consisting of 2,6-di-tert. butyl-4-methyl phenol, p-butyl amino phenol, 2,2'-methylene bis (4-methyl-6-tert. butyl phenol), 4,4'-thio bis (6-tert. butyl-2-methyl phenol), 2,6-bis (2'-hydroxy-3'-tert. butyl-5'-methyl benzoyl)-4-methyl phenol and at least one member selected from the group consisting of, dilauryl thio dipropionate, distearyl thio dipropionate, and 2-mercaptobenzo imidazole in total in an amount of from 0.001 to 5 parts by weight based on 100 parts by weight of the composition, as the stabilizer.

7. A molding composition produced by blending (A) from 5 to 35 parts by weight of a rubbery polymer prepared by emulsion polymerisation, in an aqueous system containing sodium dioctyl sulfo succinate or sodium dihexyl sulfosuccinate as the emulsion stabilizer, of a mixture of monomers comprising from 30 to 55% by weight of butadiene from 5 to 55% by weight of methyl methacrylate and from 10 to 60% by weight of ethyl acrylate, in 100 parts by weight of which from 0.5 to 3.0 parts by weight of ethylene glycol dimethacrylate is contained, with (B) from 65 to 95 parts by weight of a rigid resinous methacrylic polymer which is prepared by suspension polymerization, in an aqueous system containing water-soluble partially saponified methyl methacrylate polymer as the suspension stabilizer, of a mixture of monomers comprising from 80 to 100% by weight of methyl methacrylate and up to 20% by weight of methyl acrylate.

8. A molding composition as defined in claim 7 which contains at least one member selected from the group consisting of 2,6-di-tert. butyl-4-methyl phenol, p-butyl amino phenol, 2,2'-methylene bis (4-methyl-6-tert. butyl phenol), 4,4'-thio bis (6-tert. butyl-2-methyl phenol), 2,6-bis (2'-hydroxy-3'-tert. butyl-5'-methyl benzoyl)-4-methyl phenol and at least one member selected from the group consisting of, dilauryl thio dipropionate, distearyl thio dipropionate, and 2-mercaptobenzo imidazole in total in an amount of from 0.001 to 5 parts by weight based on 100 parts by weight of the composition, as the stabilizer.

(References on following page)

References Cited

UNITED STATES PATENTS

| | | | |
|---|---|---|---|
| 3,222,421 | 12/1965 | Lundberg | 260—862 |
| 3,251,801 | 5/1966 | Bcag | 260—45.95 |
| 2,468,094 | 4/1949 | Marks | 260—885 |
| 2,710,292 | 6/1955 | Brown | 260—80.7 |
| 2,739,122 | 3/1956 | Kennerly et al. | 260—45.6 |
| 3,073,798 | 1/1963 | Baer | 260—876 |

FOREIGN PATENTS

| | | |
|---|---|---|
| 637,626 | 3/1962 | Canada. |
| 959,416 | 6/1964 | Great Britain. |
| 581,258 | 8/1959 | Canada. |
| 844,325 | 8/1960 | Great Britain. |
| 893,084 | 4/1962 | Great Britain. |

OTHER REFERENCES

Sisley, J. P.: Encyclopedia of Surface Active Agents Chemical Publishing Co., N.Y., 1952, p. TP 990 S5 i.e.

Compounding Ingredients for Rubber. "Rubber World," Cuneo Press, Cambridge, Mass., 1961, p 120 TS 1890 I 53.

MURRAY TILLMAN, *Primary Examiner.*

M. J. TULLY, *Assistant Examiner.*